United States Patent [19]

Shimizu et al.

[11] Patent Number: 5,552,030
[45] Date of Patent: Sep. 3, 1996

[54] METHOD OF MAKING A MAGNETIC MATERIAL IN THE FORM OF A MULTILAYER FILM BY PLATING

[75] Inventors: Kazuo Shimizu; Motonobu Onoda; Takeji Tsuchiya, all of Yono; Tohru Watanabe, Atsugi, all of Japan

[73] Assignee: Nippon Piston Ring Co., Ltd., Tokyo, Japan

[21] Appl. No.: 196,062

[22] PCT Filed: Sep. 24, 1993

[86] PCT No.: PCT/JP93/01365

§ 371 Date: Feb. 22, 1994

§ 102(e) Date: Feb. 22, 1994

[87] PCT Pub. No.: WO94/08072

PCT Pub. Date: Apr. 14, 1994

[30] Foreign Application Priority Data

Sep. 25, 1992 [JP] Japan ............................ 4-280861

[51] Int. Cl.⁶ .................. C25D 5/18; C25D 11/00; C25D 5/10; C25D 5/50

[52] U.S. Cl. ................. 205/105; 205/106; 205/176; 205/180; 205/227

[58] Field of Search ........................ 205/105, 106, 205/176, 90, 180, 220, 224, 227

[56] References Cited

U.S. PATENT DOCUMENTS

| | | | |
|---|---|---|---|
| 2,443,756 | 6/1948 | Williams et al. | 205/227 |
| 4,288,260 | 9/1981 | Senno et al. | 148/121 |
| 4,652,348 | 3/1987 | Yahalom et al. | 205/104 |
| 4,699,696 | 10/1987 | Combs et al. | 204/44.2 |

FOREIGN PATENT DOCUMENTS

| | | |
|---|---|---|
| 58-37147 | 3/1983 | Japan . |
| 59-34780 | 8/1984 | Japan . |
| 59-177353 | 10/1984 | Japan . |
| 60-33382 | 2/1985 | Japan . |
| 6217620 | 10/1985 | Japan . |
| 62-142751 | 6/1987 | Japan . |
| 4183893 | 6/1992 | Japan . |
| 9408072 | 4/1994 | WIPO . |

OTHER PUBLICATIONS

Sysic et al., "Correlation of the Crystallization Process of Amorphous Magnetics $Fe_{90}Ni_{10}$ and $Fe_{90}Ni_{1.5}Si_{5.5}B_3P_{0.015}$ with Changes of Electrical Resistance and Magnetic Permability", J. of Mat. Science, vol. 27, No. 3, Feb. 1, 1992, pp. 729–733.

Cohen et al., "Electroplating of Cyclic Multilayered Alloy (CMA) Coatings", J. Electrochem. Soc., vol. 130, No. 10 Oct. 1983, pp. 1987–1995.

Lowenheim, Electroplating ©1978, pp. 139–140.

Primary Examiner—John Niebling
Assistant Examiner—Edna Wong
Attorney, Agent, or Firm—Birch, Stewart, Kolasch & Birch, LLP

[57] ABSTRACT

The present invention is directed to a method of applying a magnetic thin film on a substrate by alloy electroplating in which the alloy content in the deposition is defined by an electric current density in the course of the plating operation. The magnetic thin film is superior in uniformity and formability on a complicated substrate. The method comprises the step of changing the electric current density from a low value to a high value, and vice versa at predetermined intervals during plating to laminate different alloy-content plated layers into a multilayer thin film, and improving the magnetic characteristics of the film by heat treatment.

5 Claims, 7 Drawing Sheets

METHOD OF MAKING A MAGNETIC MATERIAL IN THE FORM OF A MULTILAYER FILM BY PLATING

TECHNICAL FIELD

The present invention relates to a method of making a magnetic material in the form of a multilayer thin film by alloy electroplating, and more particularly to a method of making such a magnetic thin film that is suitable for use as a magnetic head and for magnetic storage.

BACKGROUND OF THE INVENTION

Methods of making amorphous alloy magnetic materials by liquid cooling or sputtering are well known. The method of liquid cooling provides the magnetic material only in the form of a ribbon or wire. The ribbon or wire can not be used as a magnetic thin film on a substrate unless it is bonded to the substrate by the use of an adhesive agent. This has the problem that the bonding strength between the film and the substrate is not always reliable due to secular deterioration of the adhesive agent. The method of sputtering has another problem in that it is very costly.

The conventional method of plating provides no other than a monolayer magnetic thin film. The monolayer thin film is formable on the substrate without the adhesive agent, even if the substrate is complicated in shape. However, the monolayer thin film tends to have scattered, uneven portions and is unable to provide a desired saturation magnetic flux density of more than 8000 (gauss).

The inventors of the present application have developed a method of alloy electroplating into the present invention, considering that the aforementioned problems might be solved by electroplating an improved magnetic multilayer thin film directly onto the substrate.

An object of the present invention is to provide a method of making a magnetic material in the form of a multilayer thin film by alloy electroplating. Another object of the present invention is to provide a method of making such a multilayer thin film that is superior in uniformity as well as magnetic characteristics and directly formable on the substrate, even if the substrate is complicated in shape.

DISCLOSURE OF THE INVENTION

In order to complete the objects as described above, the present invention consists in the method comprising the step of instantly changing the electric current value at predetermined intervals during plating to form different alloy-content plated layers, laminating the thus formed different alloy-content layers into a multilayer thin film, and improving the multilayer thin film in magnetic properties by heat treatment. The electric current value or the plating current density defines the alloy content in each layer plated in the course of the plating operation. The obtained multilayer thin film is superior in uniformity as well as magnetic characteristics.

An instant rise in the electric current value or plating current density alters the alloy content in the plating layer at the same time, so that another alloy-content layer is plated over a previous alloy-content layer. For example, a fresh crystal alloy layer is plated over a previous amorphous alloy layer. Thereafter, an instant reduction in the electric current value alters the alloy content again, for example, another amorphous alloy layer is plated over the crystal alloy layer. When the electric current value is repeatedly changed at intervals during plating to laminate the different alloy-content layers over one another. It is easy to control the multilayer film in content and thickness, because the alloy content and the thickness of each layer are freely determined by adjusting the current value and time interval while the layer is plated.

Thus, different alloy-content layers are laminate over one another to form a mulilayer thin film. It is easy to improve the film in magnetic characteristics by heat treatment. For example, if a multilayer thin film has its amorphous alloy layers modified in full or partly into crystal alloy layers by a heat treatment, it will have a larger saturation magnetic flux density after the heat treatment than before the heat treatment. The heat-treatment temperature can be determined from the data of thermal analysis on different alloy-content plated layers.

The graph of FIG. 1 has curves plotted from DSC (Differential Scanning Calorimeter) data of the alloy layers plated under the respective plating current densities of 0.1 A/dm$^2$, 1.0 A/dm$^2$, and 8.0 A/dm$^2$. The curves with peaks indicate as follows:

The amorphous alloy layer plated at 0.1 A/dm$^2$ has a range of crystallization temperatures of from 289.6° C. to 338.7° C. with two peak temperatures of 299.7° C. and 330.8° C. The amorphous alloy layer plated at 1.0 A/dm$^2$ crystallizes at 345.6° C. The crystal alloy layer plated at 8.0 A/dm$^2$ modifies at 435.1° C.

The graph suggests that, when a multilayer thin film is composed of amorphous alloy layers plated at 0.1 A/dm$^2$ and 1.0 A/dm$^2$, and crystal alloy layers plated at 8.0 A/dm$^2$, it is possible to crystallize the amorphous alloy layers plated at 0.1 A/dm$^2$ without influencing the both the amorphous and crystal layers at 1.0 and 8.0 A/dm$^2$ by a heat treatment of 345.6° C. or lower.

The graph also suggests that a multilayer thin film can have all the layers crystallized when it is treated at a temperature higher than a temperature in which all the amorphous alloy layers in the multilayer film terminate crystallization, and that, when it is treated in a range of temperatures between which one of the amorphous alloy layers initiates and terminates crystallization, it can have the unmodified amorphous alloy layers coexisting with the crystal alloy layers initially plated and modified by the heat treatment, because the amorphous alloy layer is partly crystallized and partly remains unchanged.

The inventive method of making a magnetic material has the step of instantly altering the current values at predetermined intervals during alloy electroplating to laminate different alloy-content plated layers into a multilayer film that is superior in magnetic characteristics and easily formable on the substrate even if the substrate is complicated in shape. The multilayer film can be improved in magnetic characteristics by heat treatment. The advantage offered by the present invention is that high quality magnetic thin films can be manufactured at low cost in comparison with the conventional method of liquid cooling, sputtering, or monolayer-electroplating.

BEST MODE OF CARRYING OUT THE INVENTION

The present invention will be explained by way of example with reference to the laboratory experiment.

Figure 1:
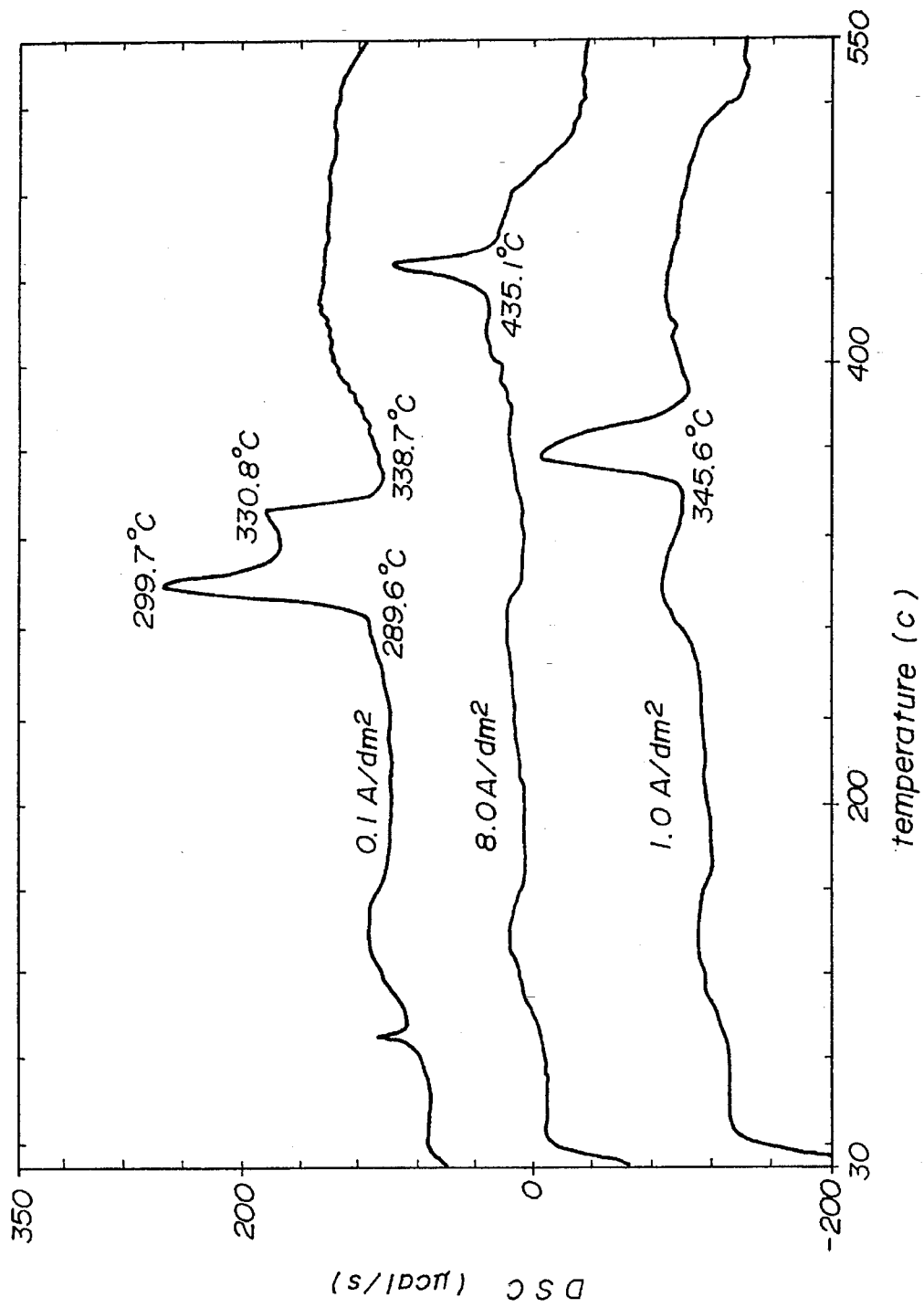
FIG. 1 is a graph showing DSC curves of Ni—Co—B alloy plated layers.
Figure 2:
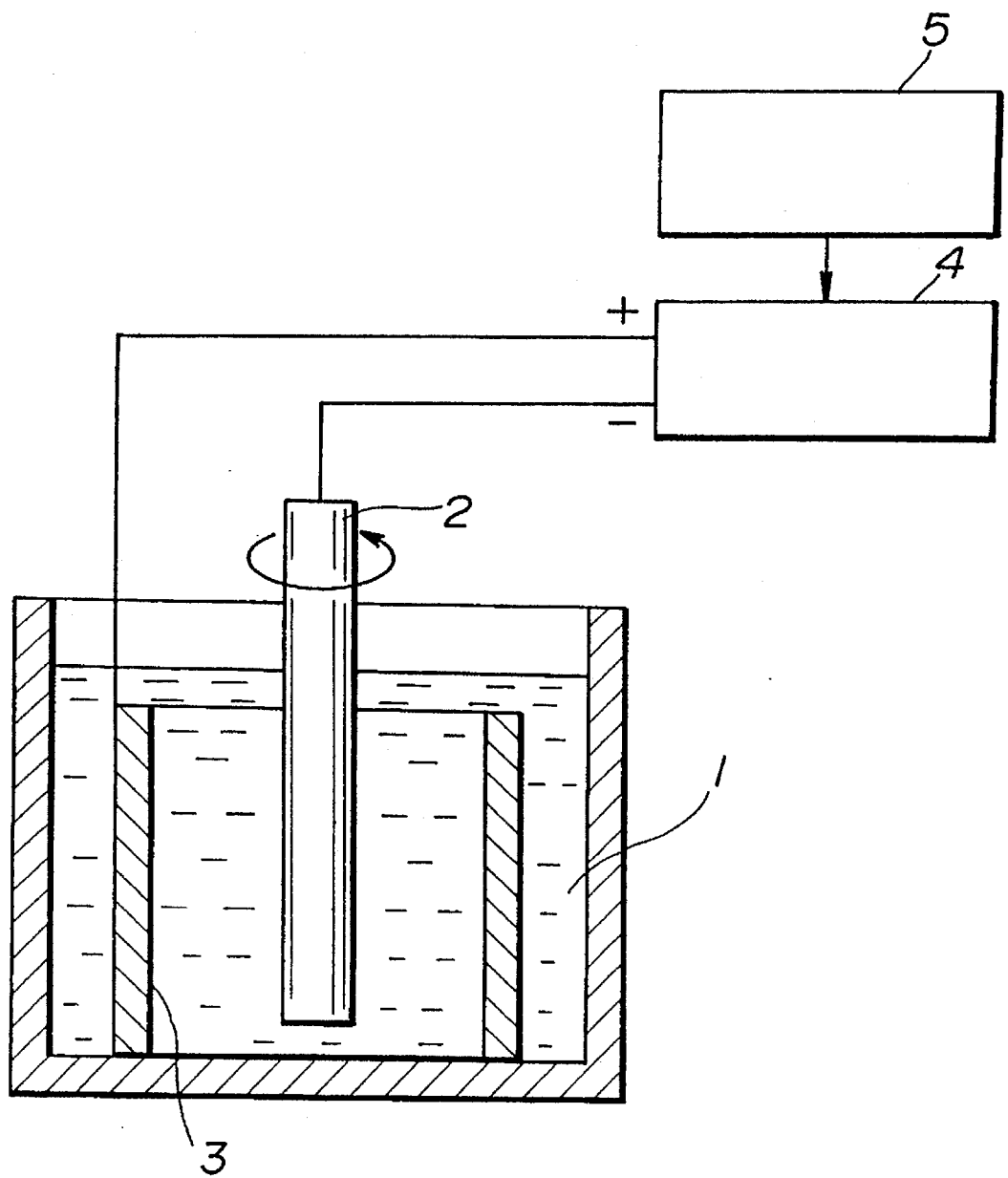
FIG. 2 is a view showing laboratory equipment used to perform experiments according to the present invention.

As seen in FIG. 2, the laboratory equipment has a plating bath 1, a rotary electrode 2 as cathode and an object 3 as anode immersed in the bath 1. The electrode 2 is surrounded by the object 3 on which the alloy is electroplated. The electrode 2 and the object 3 are respectively connected to a potentiostat 4 with a function generator 5. The function generator 5 is arranged to supply the electrode 2 and the object 3 with a predetermined pattern of electric current through the potentiostat 4.

Figure 3:
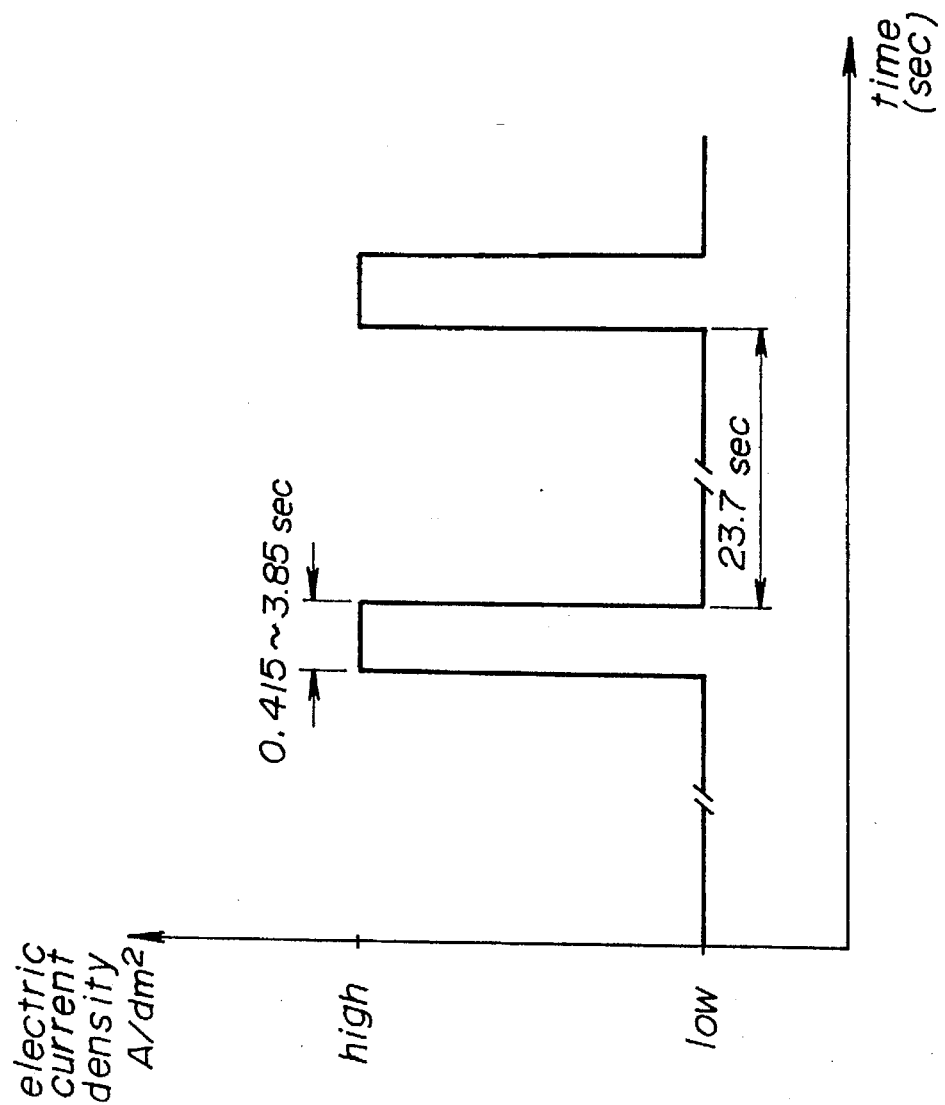
FIG. 3 is a graph showing the electric current values during plating in the experiment; of the present invention

As seen in FIG. 3, the electric current density was instantly raised or lowered after it was maintained at preselected low or high value for predetermined intervals. The rise and fall of the electric current density was repeatedly alternated during plating, resulting in the electroplating of alternative alloy-content layers in the form of a multilayer film.

The inventive examples had the amorphous alloy layers plated at an electric current density of 1.0 A/dm² or less and the crystal alloy layers plated at an electric current density of 1.5 A/dm² or more.

The electric current density was maintained at a fixed value during plating to form a monolayer film as a comparative example.

The plating bath compositions are as follows:

| Nickel sulfate | (NiSO$_4$·6H$_2$O): | 240 g/L |
| Cobalt sulfate | (CoSO$_4$·7H$_2$O): | 45 g/L |
| Nickel chloride | (NiCl$_2$·6H$_2$O): | 45 g/L |
| Boric acid | (H$_3$BO$_3$): | 30 g/L |
| Trimethylamine borane | [(CH$_3$)$_3$NBH$_3$]: | 3 g/L |

The plating condition is as follows:

Cathode: rotary electrode

Peripheral Speed: 300 cm/sec

Bath Temperature: 55±1° C.

Current Density Pattern:

Low: 0.1~1.5 A/dm²×23.7 sec

High: 1.0~8.0 A/dm²×3.85~0.4157 sec

Twenty-three sorts of examples were obtained from the experiment, No. 1 to No. 5 comparative examples in the form of a monolayer film and No. 6 to No. 23 inventive examples in the form of a multilayer film. No. 6 to No. 23 examples were heat-treated at the following temperatures selected with reference to the respective low current densities:

Low current density 0.1 A/dm²: 338.7° C.

Low current density 1.0 A/dm²: 345.6° C.

Low current density 1.5 A/dm²: 399.5° C.

The saturation magnetic flux density of each example was measured before and after the heat treatment. The experimental results are shown in the following table, in which "mono", "am" and "cr" are the respective abreviations of "monolayer", "amorphous" and "crystal".

TABLE

| Example No. | Number of Layers | Current Density (A/dm²) low/high | Alloy-Content | Saturation Magnetic Flux Density: G(gauss) no heat treatment | with heat treatment |
|---|---|---|---|---|---|
| 1 | mono | 0.1 | amorphous | non-magnetic | — |
| 2 | ↑ | 1.0 | ↑ | 4500 | — |
| 3 | ↑ | 1.5 | crystal | 5500 | — |
| 4 | ↑ | 3.0 | ↑ | 7000 | — |
| 5 | ↑ | 8.0 | ↑ | 7500 | — |
| 6 | 400 | 0.1/1.0 | am/am | 9000 | 9800 |
| 7 | ↑ | 0.1/1.5 | ↑/cr | 5900 | 6200 |
| 8 | ↑ | 0.1/3.0 | ↑/↑ | 7500 | 7900 |
| 9 | ↑ | 0.1/8.0 | ↑/↑ | 7800 | 8100 |
| 10 | ↑ | 1.0/1.5 | ↑/↑ | 9200 | 9800 |
| 11 | ↑ | 1.0/3.0 | ↑/↑ | 15000 | 17000 |
| 12 | ↑ | 1.0/8.0 | ↑/↑ | 17400 | 17900 |
| 13 | ↑ | 1.5/3.0 | ↑/↑ | 14000 | 16000 |
| 14 | ↑ | 1.5/8.0 | ↑/↑ | 11600 | 12100 |
| 15 | 40 | 0.1/1.0 | am/am | 7000 | 7500 |
| 16 | ↑ | 0.1/1.5 | ↑/cr | 6500 | 6600 |
| 17 | ↑ | 0.1/3.0 | ↑/↑ | 8100 | 8500 |
| 18 | ↑ | 0.1/8.0 | ↑/↑ | 8100 | 8200 |
| 19 | ↑ | 1.0/1.5 | ↑/↑ | 12400 | 12800 |
| 20 | ↑ | 1.0/3.0 | ↑/↑ | 16400 | 18200 |
| 21 | ↑ | 1.0/8.0 | ↑/↑ | 17000 | 17300 |
| 22 | ↑ | 1.5/3.0 | cr/↑ | 14600 | 15100 |
| 23 | ↑ | 1.5/8.0 | ↑/↑ | 16800 | 17100 |

Microscopic specimens for transmission-type electron microscope were made by ion-thinning from No. 6, No. 9 and No. 14 examples, which were partly sliced into longitudinal sections. The metallographic and crystallographic photomicrographs, by electron diffraction, were made from the microscopic specimens by the use of the transmission-type electron microscope.

Figure 4A:
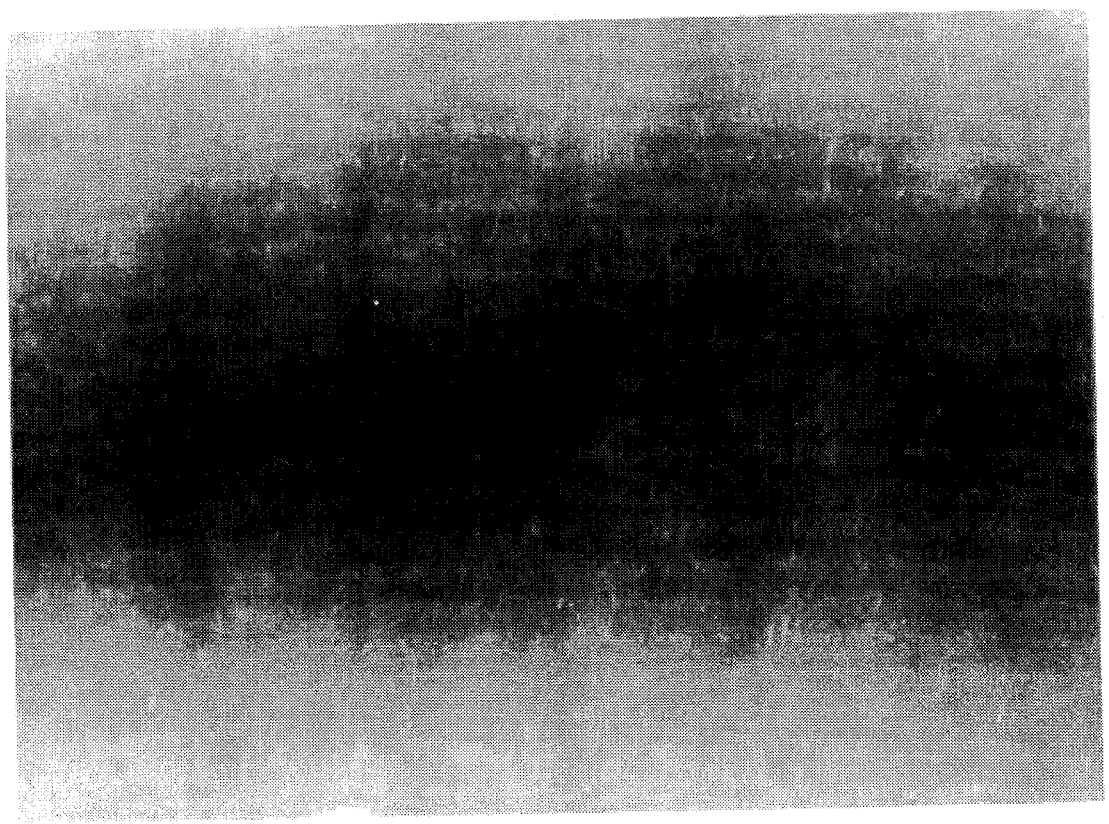
FIG. 4(a) is a metallographic photomicrograph, by a transmission-type electron microscope, of example No. 6 after heat treatment.
Figure 4B:
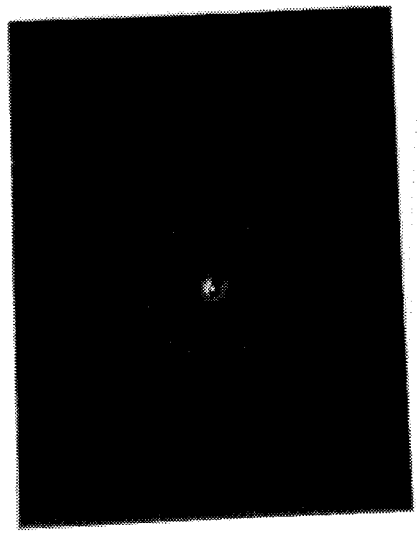
FIG. 4(b) is a photomicrograph showing the crystal structure, by electron diffraction, of the white portion of the metallographic photomicrograph of example No. 6 in FIG. 4(a)
Figure 4C:
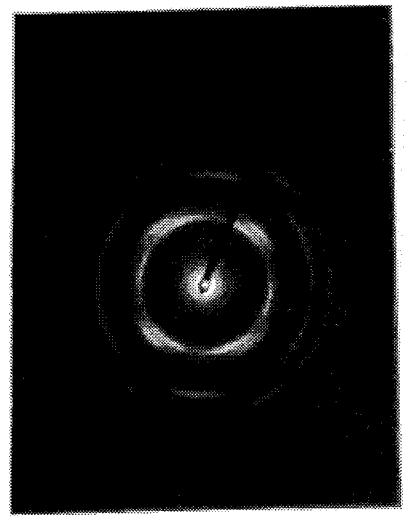
FIG. 4(c) is a photomicrograph showing the crystal structure, by electron diffraction, of the dark portion of the metallographic photomicrograph of example No. 6 in FIG. 4(a)

Referring to FIG. 4(a) in which at 210000 magnification is shown the metallographic photomicrograph of No. 6 example after the heat treatment, illustrates that the amorphous Ni—Co—B alloy plated layers and the crystal Ni—Co—B alloy plated layers crystallized from the other amorphous Ni—Co—B alloy plated layers are continuously laminated over each other. Referring to FIGS. 4(b) and 4(c) in which there are shown the respective crystal structures of white amorphous and dark crystal alloy plated layers, the both photomicrographs illustrate that the crystal alloy plated layer crystallized from the amorphous alloy plated layer by the heat treatment is different in crystal orientation from the initially crystallized crystal alloy plated layer.

Figure 5A:
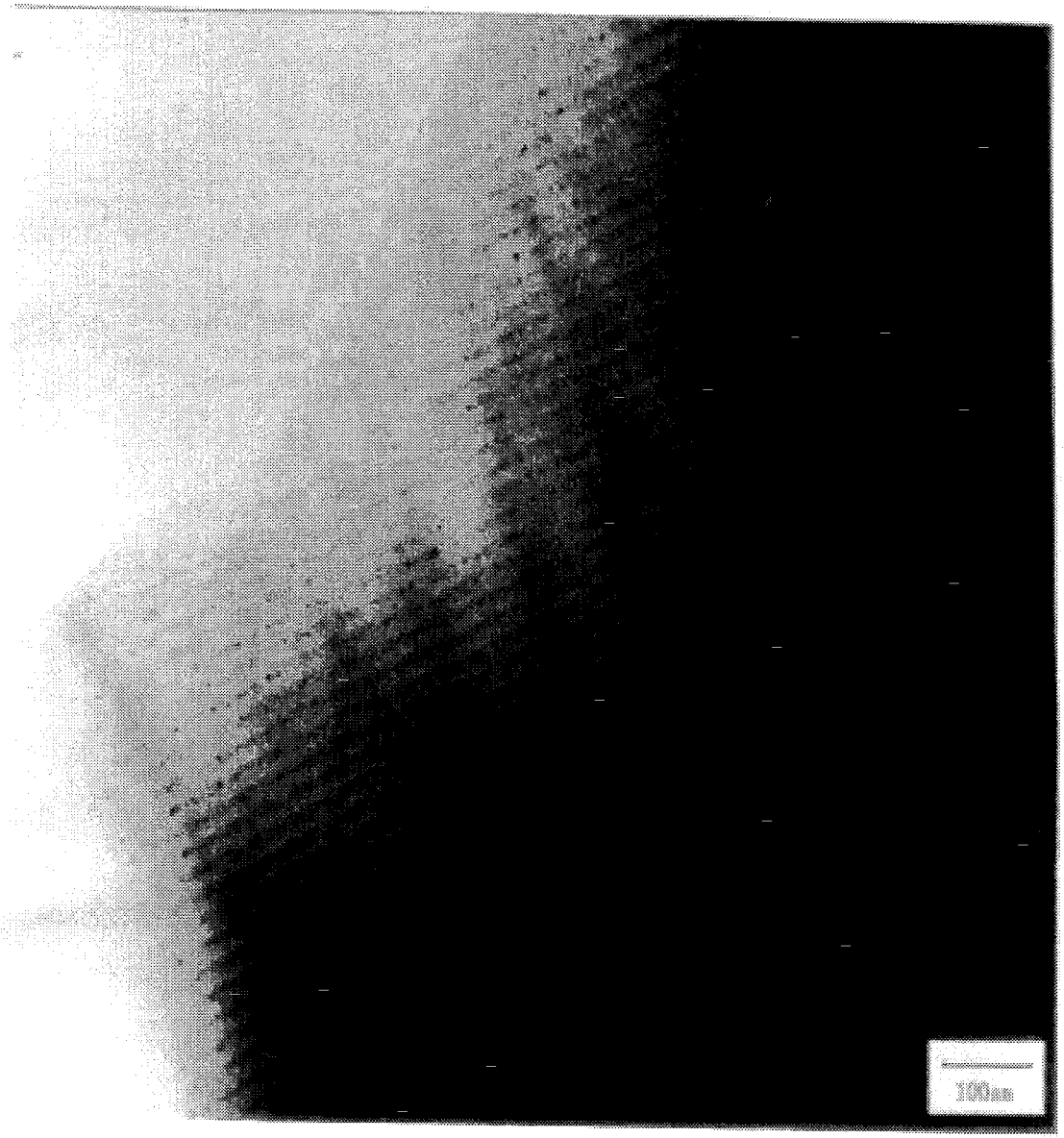
FIG. 5(a) is a metallographic photomicrograph, at 92000 magnification by transmission-type electron microscope, of example No. 9 before heat treatment.

Referring to FIG. 5(a) in which at 92000 magnification is shown the metallographical photomicrograph of No. 9 example before the heat treatment, it illustrates the multilayer film consisting of white and dark plated layers laminated over each other.

Figure 5B:
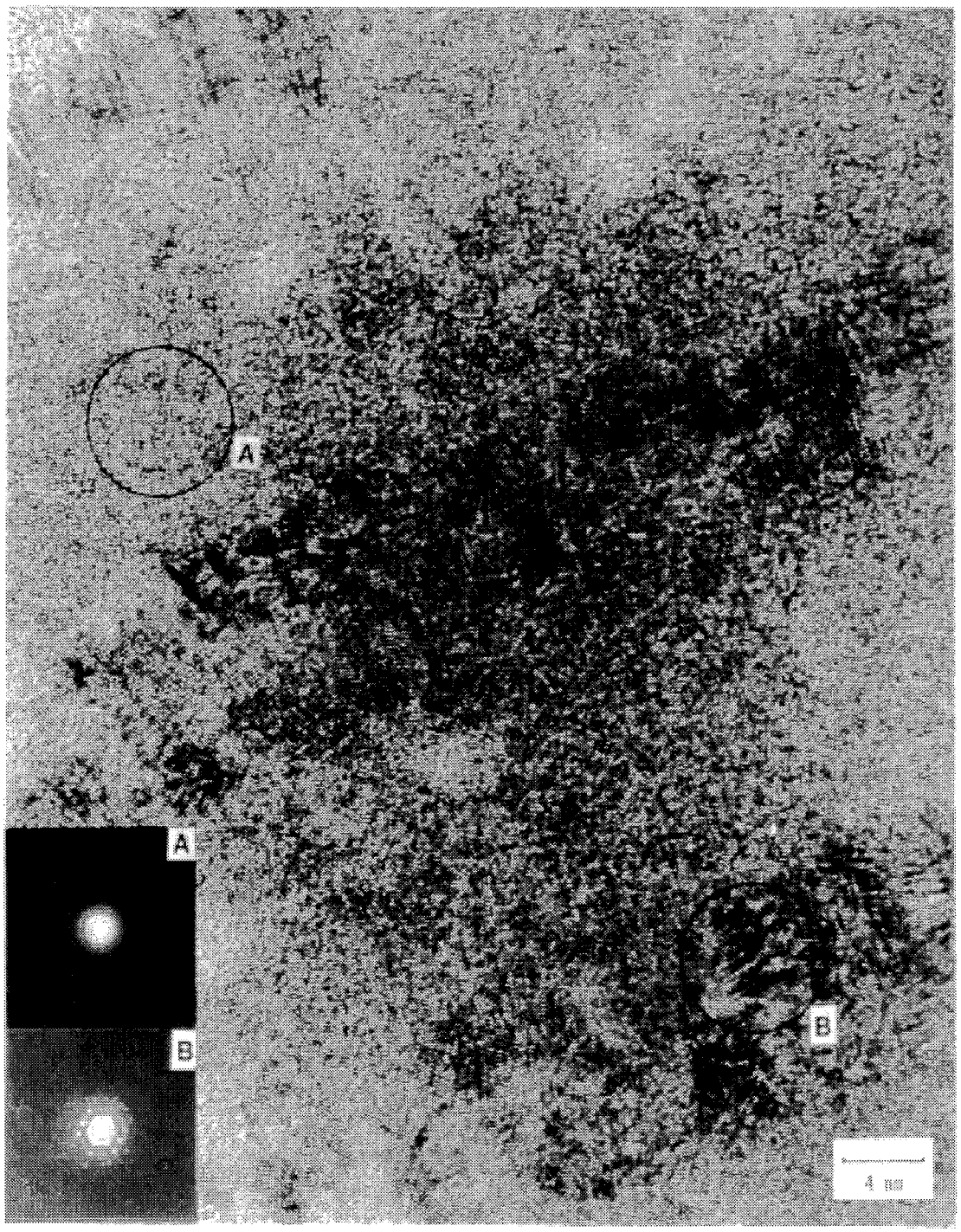
FIG. 5(b) is a metallographic photomicrograph at 300000 magnification by transmission-type electron microscope, of example No. 9 before heat treatment and two photomicrographs showing the respective crystal structures, by electron diffraction, of A and B portions in the above-mentioned metallographic photomicrograph.

Referring to FIG. 5(b) in which at 2300000 magnification is shown the metallographic photomicrograph of the same No. 9 example, it has two white and dark portions A and B encircled by the individual circle lines and accompanies two crystallographic photomicrographs A and B in its under left. The photomicrographs A and B illustrate the crystal structures of the white and dark portions A and B in the aforementioned metal lographic photomicrograph. The photomicrograph A shows a hallow-pattern, so that the white portion is amorphous. The photomicrograph B shows a particulate-pattern, so that the dark portion is crystal. Accordingly, the example has a multilayer film composed of amorphous and crystal Ni—Co—B alloy plated layers laminated over each other.

Figure 6A:
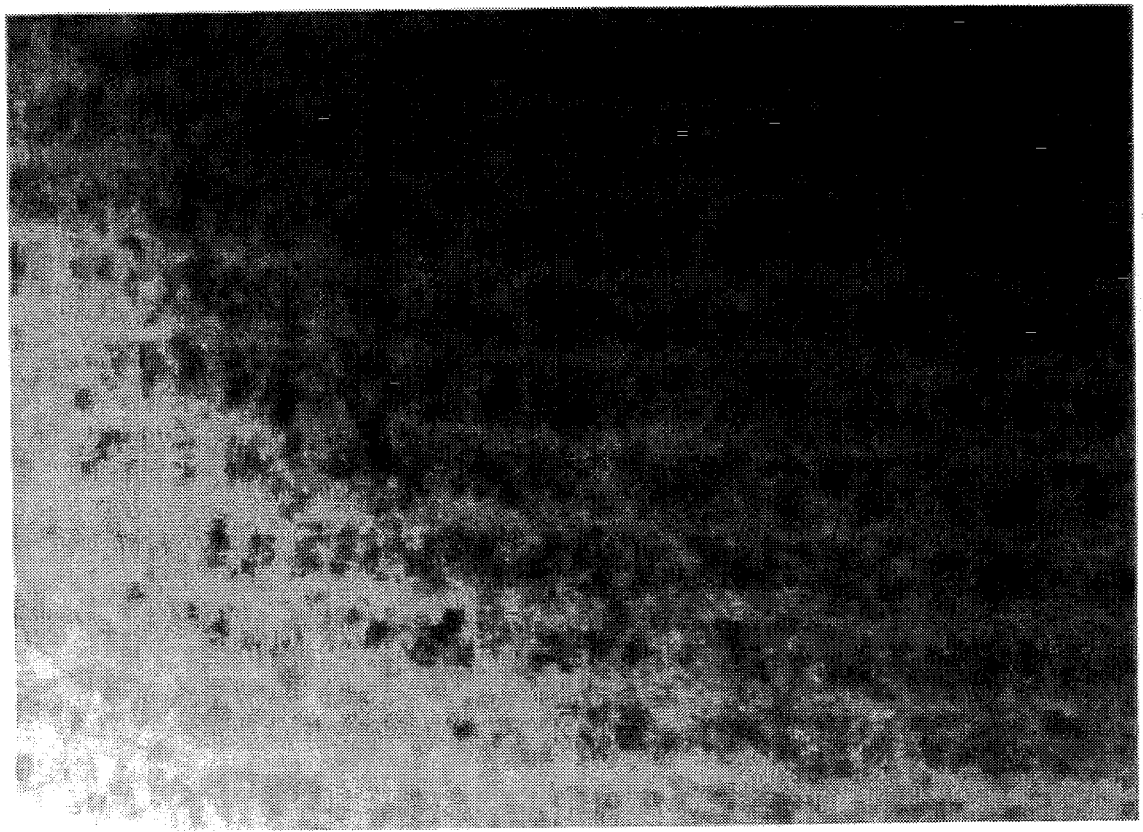
FIG. 6(a) is a metallographic photomicrograph, by transmission-type electron microscope, of example No. 14 after heat treatment.
Figure 6B:
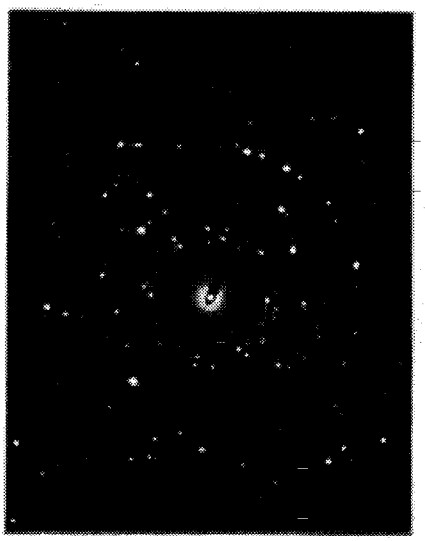
FIG. 6(b) is a photomicrograph showing the crystal structure, by electron diffraction, of the dark portion of the metallographic photomicrograph of example No. 14 in FIG. 6(a)
Figure 6C:
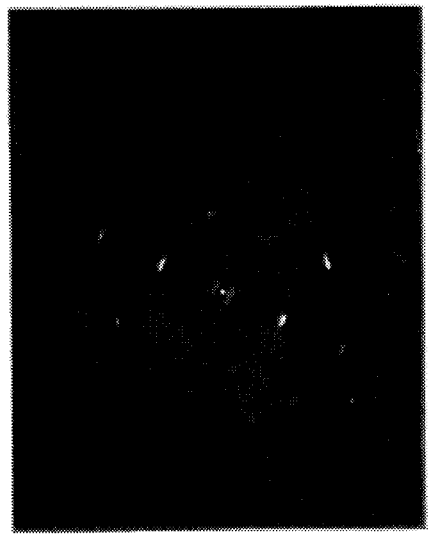
FIG. 6(c) is a photomicrograph showing the crystal structure, by electron diffraction, of the white portion of the metallographic photomicrograph of example No. 14 in FIG. 6(a)

There are illustrated dark and white portions in FIG. 6(a) in which at 430000 magnification is shown the metallographic photomicrograph of No. 14 example after the heat treatment. FIGS. 6(b) and 6(c) illustrate the respective crystallographic photomicrographs of the dark and white portions shown in FIG. 6(a). The photomicrographs show that the dark and white portions are crystal and that the example has a multilayer film consisting of crystal layers laminated over each other.

The experimental results in the table indicate as follows:

Time plated film has a saturation magnetic flux density increased with the electric current density in the course of plating, whether it is of monolayer or multilayer.

In the case of monolayer and multilayer films formed under practically similar plating current density, the multilayer film has a larger saturation magnetic flux density than the monolayer film.

The multilayer film can have a larger saturation magnetic flux density after heat treatment than before or without heat treatment.

The multilayer film of the type having a saturation magnetic flux density of 8000 Gauss or more is easily manufacturable in accordance with the inventive method of Ni—Co—B alloy electroplating.

INDUSTRIAL ADAPTABILITY

From the foregoing, the method of the present invention laminates different alloy-content layers into a multilayer film that is superior in uniformity as well as magnetic properties. The multilayer film is easily formed on the substrate even if the substrate is complicated in shape and modifiable in magnetic properties by heat treatment Accordingly, the present invention is available for manufacturing high quality magnetic thin films at low cost. The films are suitable for use in magnetic thin film heads, magnetic thin film storages, thin film inductors, small transformers, small electric motors, and torque sensors.

We claim:

1. A method of making a magnetic material in the form of a multilayer thin film by alloy electroplating on an object in which the alloy content in a plated layer is defined by the plating current density utilized in the course of plating, said method comprising the step of altering said plating current density at intervals during plating to laminate different alloy-content plated layers into a multilayer thin film in a plating bath having a rotary electrode as a cathode and the object on which the alloy is electroplated as the anode, said anode and cathode being supplied with a predetermined pattern of electric current, and heat-treating said multilayer thin film to modify the magnetic characteristics thereof, said different alloy content plated layers being composed of amorphous alloy plated layers and crystal alloy plated layers alternatively overlapped to each other.

2. The method as claimed in claim 1, further comprising the step of heat-treating said multilayer thin film to modify the magnetic characteristics thereof.

3. The method as claimed in claim 2, wherein said multilayer thin film is heat-treated in a range of temperatures in which said amorphous alloy plated layers terminate crystallization.

4. The method as claimed in claim 2, wherein said multilayer thin film is heat-treated in a range of temperatures between which one of said amorphous alloy plated layers initiates and terminates crystallization.

5. The method as claimed in claim 2, wherein said multilayer thin film is heat-treated in a range of temperatures in which said crystal alloy plated layers are modifiable.

* * * * *